May 5, 1964  H. G. ROBBINS  3,131,734
MACHINE FOR FEEDING LOGS TO BAND SAW FOR SPLITTING LOGS
Filed Dec. 21, 1961  2 Sheets-Sheet 1
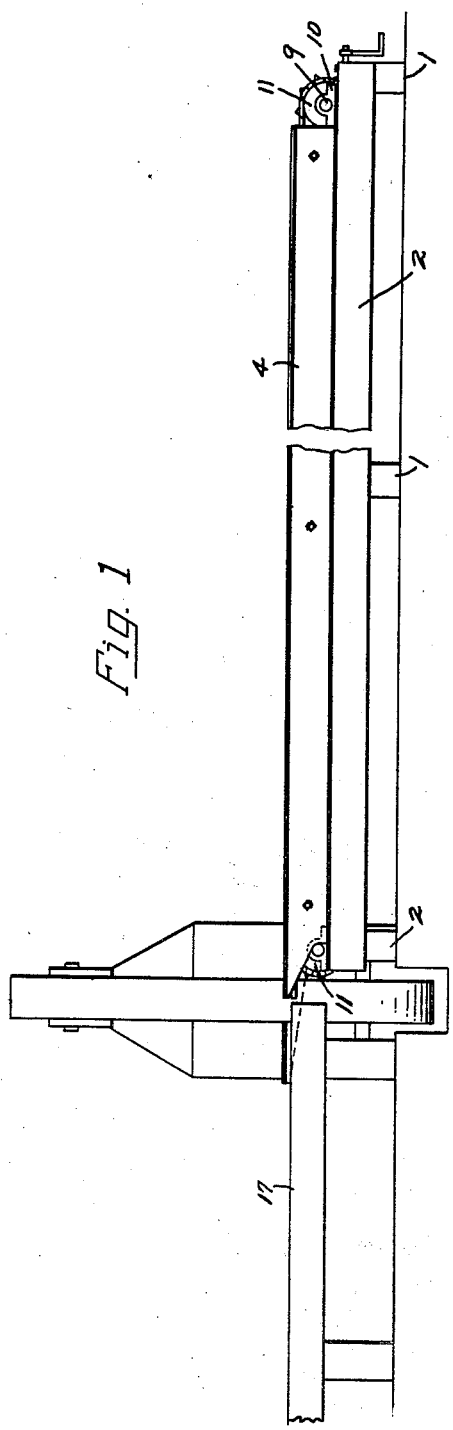
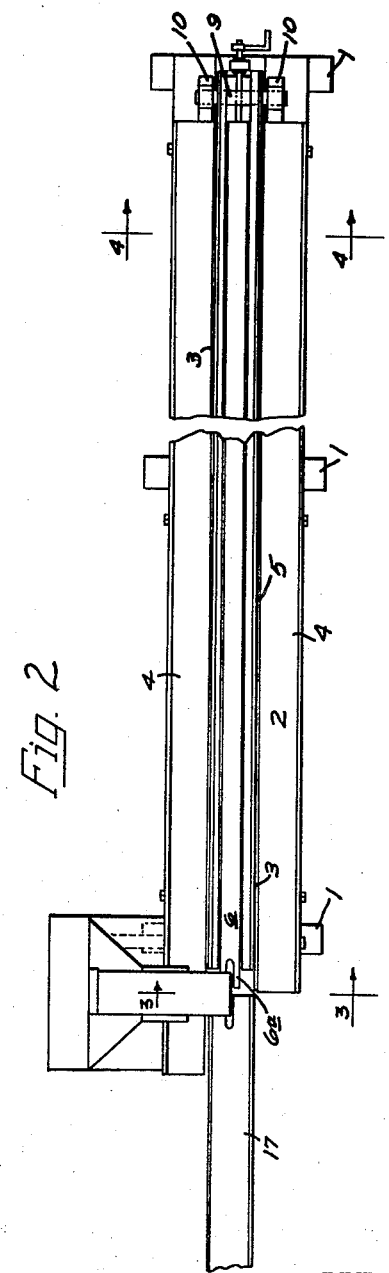
INVENTOR.
HOWARD G. ROBBINS
BY Wells & St John
ATTYS.

May 5, 1964
H. G. ROBBINS
3,131,734
MACHINE FOR FEEDING LOGS TO BAND SAW FOR SPLITTING LOGS
Filed Dec. 21, 1961
2 Sheets-Sheet 2
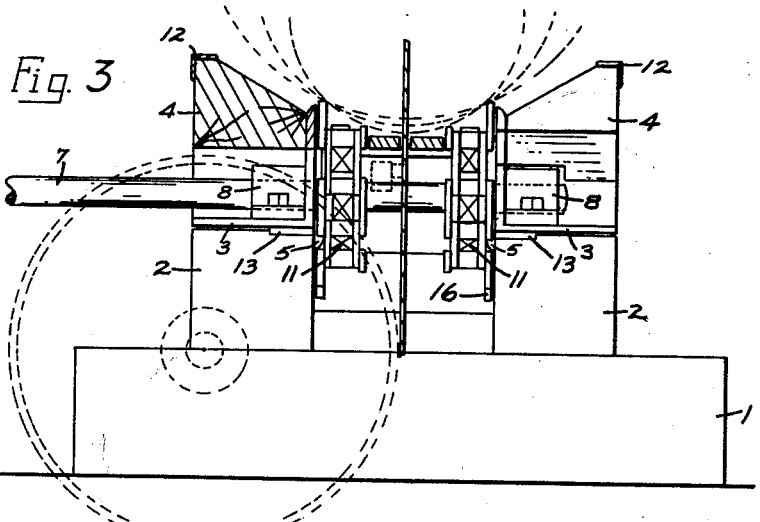
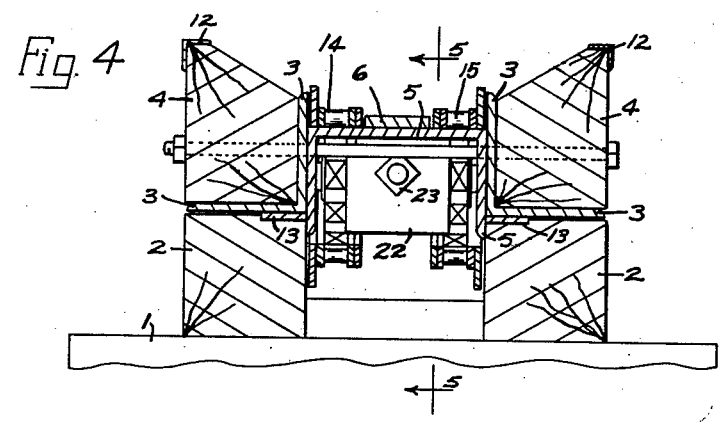
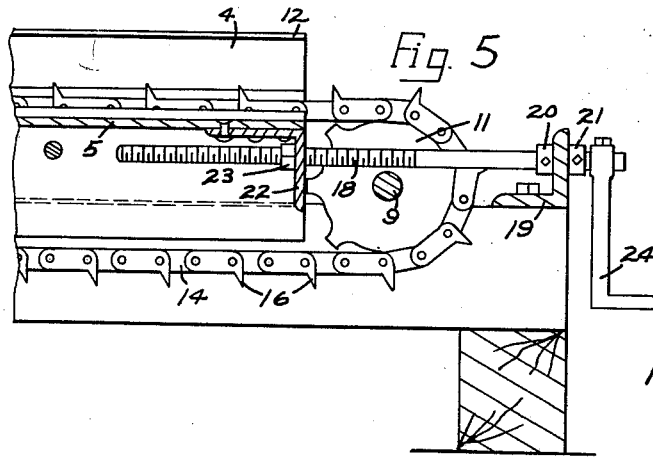
INVENTOR.
HOWARD G. ROBBINS
BY
ATTYS.

United States Patent Office 3,131,734
Patented May 5, 1964

3,131,734
MACHINE FOR FEEDING LOGS TO BAND SAW FOR SPLITTING LOGS
Howard G. Robbins, Riverview Terrace,
E. 1801 Upriver Drive, Spokane, Wash.
Filed Dec. 21, 1961, Ser. No. 161,105
2 Claims. (Cl. 143—26)

My invention relates to a machine to feed logs to a band saw for splitting. It is the purpose of my invention to provide a simple machine that can be mounted on a bed frame adjacent to a band saw mill and that will carry logs rolled on to the machine into the band saw so that the saw splits the logs into two halves. The machine is constructed so that it can carry a variety of sizes of logs from large to small equally well. It is also arranged so that the log driving chains and their supporting framework can be moved back away from the saw for access to the saw itself.

The nature and advantages of my invention will appear more fully from the following description and the accompanying drawings which illustrate a preferred form of the invention.

In the drawings:

FIGURE 1 is a side view of my machine applied to a conventional band saw;

FIGURE 2 is a plan view of the machine;

FIGURE 3 is a cross sectional view taken on the line 3—3 of FIGURE 2, the positions of the band saw driving wheel and guide being illustrated in dotted lines;

FIGURE 4 is a cross sectional view taken on the line 4—4 of FIGURE 2; and

FIGURE 5 is a sectional view taken on the line 5—5 of FIGURE 4.

The machine shown has a bed frame made up of three cross timbers 1 and two longitudinal 8″ x 8″ timbers 2 mounted on the cross timbers. Eight inch angle irons 3 carry 8″ x 10″ timbers 4 that are tapered at the top as shown. The timbers 4 and the angle irons 3 are bolted to an inverted chanel 5 that is ten inches wide and that has eight inch flanges which fit down bewteen the timbers 2. The channel 5 has a center strip 6 secured to the top of the channel. This strip 6 extends beyond the end of the channel next to the band saw S and is slotted so that the saw S runs through the slot (see FIGURE 2).

Adjacent to the saw end of the channel 5 there are bearings 8 mounted on the angle irons 3 to receive a shaft 7. The shaft 7 is the drive shaft and may be powered in any suitable manner. The timber 4 and the angle iron 3 that are closest to the band saw frame F extend beyond the other timber 4 and angle iron 3 so as to keep logs away from the saw frame F until they pass beyond it. Both timbers 4 and both angle irons 3 are cut away to provide space for the bearing 8 to mount on the horizontal flanges of the angle irons 3. The slotted part 6a of the strip 6 and the angle iron 3 and timber 4 farthest from the saw frame F all extend far enough to overlap the saw S so that the log is supported until cut.

At the end of the angle irons 3 most remote from the frame F and band saw S there are bearings 10 which carry a shaft 9. Sprocket wheels 11 are mounted on the shafts 7 and 9 to carry a pair of sprocket chains 14 and 15. The sprocket wheels 11 guide the chains 14 and 15 alongside the angle irons 3. The chains 14 and 15 have drive points 16 on alternate links. These points 16 stick up to engage logs that are rolled on to the chains 14 and 15 over the tapered top surfaces of the timbers 4. When the chains are driven by the shaft 7 and the sprocket wheels 11 the points 16 on the chain links move a log thereon toward the saw and the chains ride on the channel 5. This keeps the log properly aligned as it is cut down the middle by the band saw S. The dotted lines at the top of FIGURE 3 show how different size logs are supported on the chains 14 and 15.

Logs may be rolled on to the chains from either side of the machine. The upper outer corners of the timbers 4 are protected by angle irons 12. Also plates 13 are provided on the stationary timbers 2 to support the angle irons 3. A shallow channel 17 is provided beyond the saw S to guide the half sections of the log as they move away from the saw. After the log is past the saw half sections can fall off the channel 17 to the sides upon conveyors (not shown) to carry the log sections away.

To move the machine back to permit access to the saw a screw 18 (FIGURE 5) is mounted on a cross angle iron 19 that is fastened to the rear ends of the timbers 2. Collars 20 and 21 prevent endwise movement of the screw 19 through the upright flange of the angle iron 19. An L-bracket 22, having a nut 23 welded to it, is riveted to the channel 5. The screw 18 has a handle 24 by which it can be turned to move the channel 5, the angle irons 3 and the timbers 4 toward and away from the saw. With this arrangement the whole log feeding mechanism can be moved back on the timbers 2 away from the saw far enough to permit access to it for replacement of the saw or work on it.

The bed frame timbers 2 provide a pair of stationary support and guide members for the log receiving and advancing mechanism. The angle irons 3, the tapered timbers 4 and the inverted channel 5 provide a log receiving trough with a conveyor chain guide in the central part of the trough. This trough is slidable lengthwise on the support and guide members 2 by use of the screw 18. The trough carries the conveyor chains 14 and 15 and they are adapted to carry the logs. The upper edges of the angle irons 3 form guide ribs for the chains and protection of the chains as the logs are rolled into the trough. The channel 5 is a support for the sprocket chains 14 and 15. The strip 6 provides a guide between the chains and its forked end 6a provides a saw receiving slot.

It is believed that the nature and advantages of my invention will be clear from the foregoing description.

Having described my invention, I claim:

1. A machine to feed logs to a band saw for splitting, comprising:
    a bed frame having one end adjacent to but spaced from the cutting portion of the saw and including spaced parallel supports that are parallel to the plane of said cutting portion;
    a log receiving trough mounted on said supports for sliding movement lengthwise thereof;
    a chain conveyor guide extending lengthwise of the trough in the lower central part thereof and secured to the trough;
    chain conveyor means mounted on said trough for movement lengthwise of the trough in said guide;
    a drive shaft for the chain conveyor means mounted on said trough;
    the chain conveyor guide having a band saw receiving slot projecting from the end thereof adjacent the band saw through which the band saw normally runs; and
    means on the support operable to move the trough and the guide endwise of said supports away from the saw and thereby remove the band saw from said slot.

2. A machine to feed logs to a band saw, comprising:
    a bed frame;
    a log receiving trough mounted for endwise movement on said bed frame;
    the trough comprising spaced elongated timbers with their top surfaces tapering downward toward each other;
    angle irons carrying said timbers and riding on the bed frame;

a sprocket chain support between and fastened to said angle irons;
endless sprocket chains trained around said support and having log supporting and advancing points thereon;
a drive shaft mounted on one end of the trough having sprocket wheels receiving the sprocket chains;
a second shaft mounted on the other end of the trough and having sprocket wheels guiding said chains; and
a guide strip on the sprocket chain support between the chains, the strip having a slotted end projecting beyond the support to embrace a band saw, the slotted end being removable from saw engaging position by endwise movement of the trough on the bed frame.

References Cited in the file of this patent

UNITED STATES PATENTS

| | | |
|---|---|---|
| 343,328 | Lynch | June 8, 1886 |
| 672,498 | Tothill | Apr. 23, 1901 |
| 900,677 | Mereen et al. | Oct. 6, 1908 |
| 1,041,439 | Dearborn | Oct. 15, 1912 |
| 1,601,219 | Langill | Sept. 28, 1926 |
| 2,166,447 | Ruppenthal | July 18, 1939 |
| 2,563,867 | Rathert et al. | Aug. 14, 1951 |
| 2,961,088 | Franz | Nov. 22, 1960 |